No. 785,521. PATENTED MAR. 21, 1905.
R. C. ROACH.
STOREHOUSE FOR GRAIN OR THE LIKE.
APPLICATION FILED MAY 8, 1903.

3 SHEETS—SHEET 1.

WITNESSES
A. R. Appleman
E. E. Ellis

INVENTOR
Robert C. Roach
BY
Munn
ATTORNEYS.

No. 785,521. PATENTED MAR. 21, 1905.
R. C. ROACH.
STOREHOUSE FOR GRAIN OR THE LIKE.
APPLICATION FILED MAY 8, 1903.

3 SHEETS—SHEET 3.

WITNESSES:

INVENTOR
Robert C. Roach
BY Munn & Co.
ATTORNEYS.

No. 785,521.       Patented March 21, 1905.

UNITED STATES PATENT OFFICE.

ROBERT CORNELIUS ROACH, OF HUTCHINSON, KANSAS.

STOREHOUSE FOR GRAIN OR THE LIKE.

SPECIFICATION forming part of Letters Patent No. 785,521, dated March 21, 1905.

Application filed May 8, 1903. Serial No. 156,173.

*To all whom it may concern:*

Be it known that I, ROBERT CORNELIUS ROACH, a citizen of the United States, and a resident of Hutchinson, in the county of Reno and State of Kansas, have invented a new and Improved Storehouse for Grain or the Like, of which the following is a full, clear, and exact description.

This invention relates to storehouses or repositories for grain and other cereals; and it consists, substantially, in the improvements hereinafter particularly described and then claimed.

The invention has for its principal object to provide a storehouse or repository for grain and the like which may be constructed of light material and which also is both simple and economical in its general embodiment, besides being strong and capable of long and continued service.

A further object is to provide a structure of this kind which is practically fireproof, and which also is of greatly-increased capacity for a given area of ground-surface covered thereby.

A still further object of the invention is to provide a structure of the character referred to which is thoroughly proof against the entrance of damp or moisture to the interior thereof and one also which is readily accessible either to repair any part thereof or to inspect the structure itself or the material or substances stored therein.

A further object is to provide a structure or repository in which grain or like material may be stored or kept in a state of preservation for an indefinite length of time and one also which may be rapidly filled or emptied, according as may be required; and the invention also has for its object to provide simplified and effective means whereby grain and the like may be elevated above and deposited within the structure or repository and to provide means whereby the delivery of grain from the storehouse may be readily effected in any desired quantity, either for shipment or transfer thereof or for other purposes.

The above and additional objects are attained by means substantially such as are illustrated in the accompanying drawings, in which—

Figure 1:
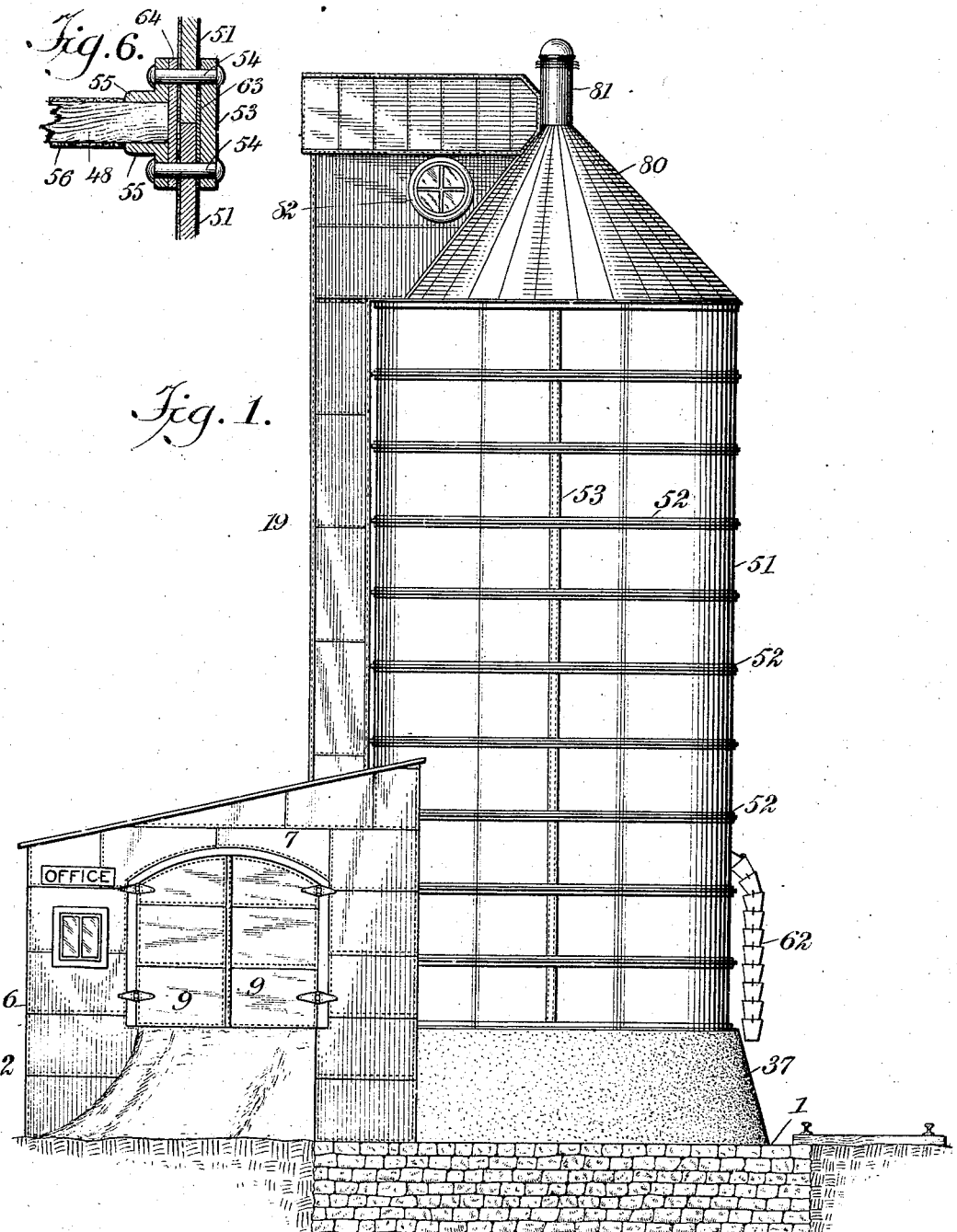
Figure 2:
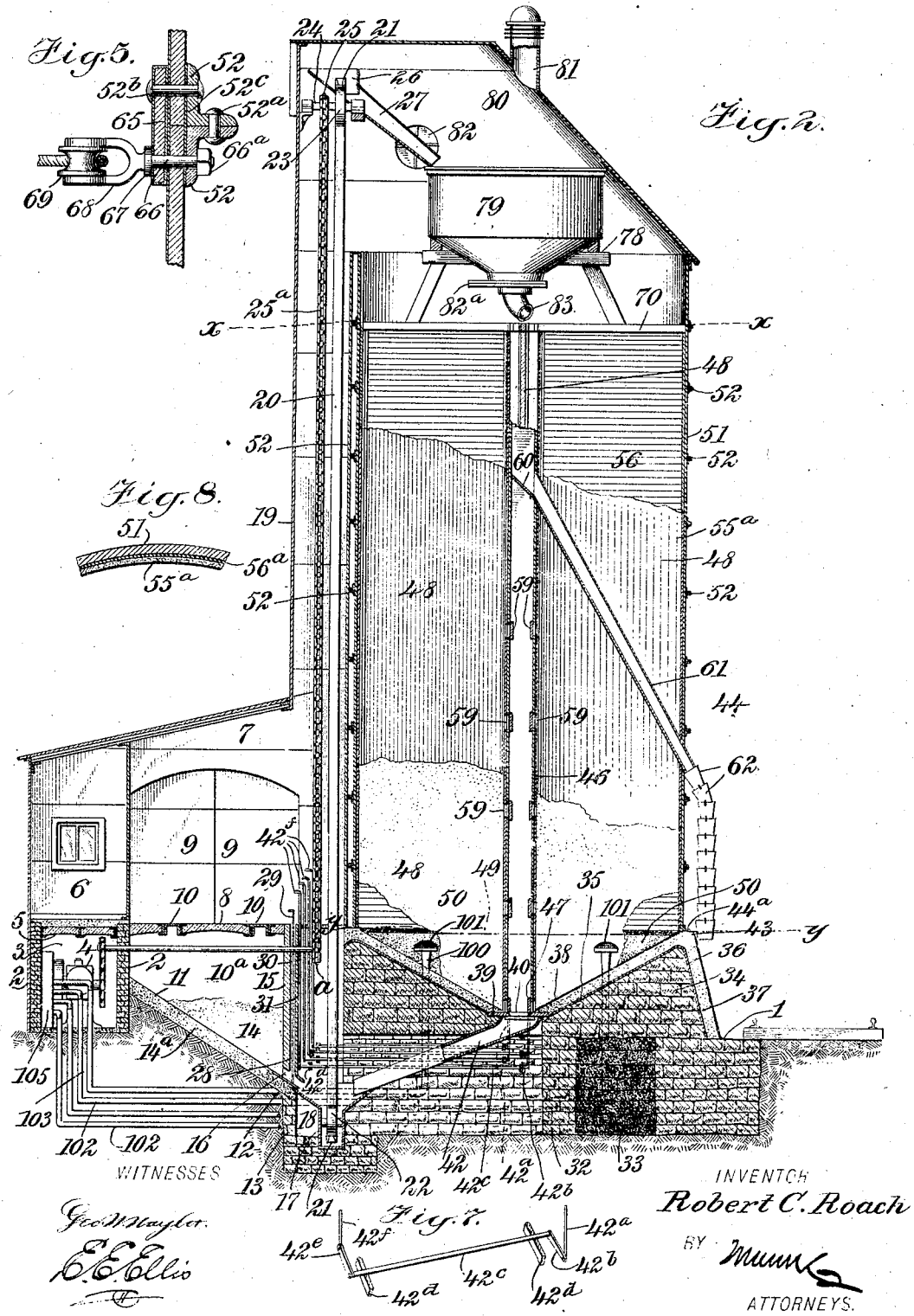
Figure 3:
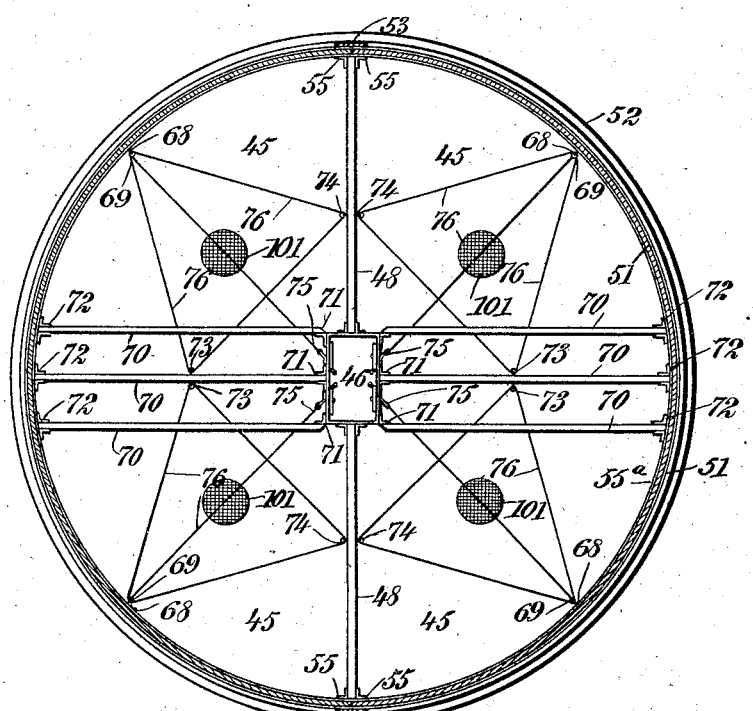
Figure 4:
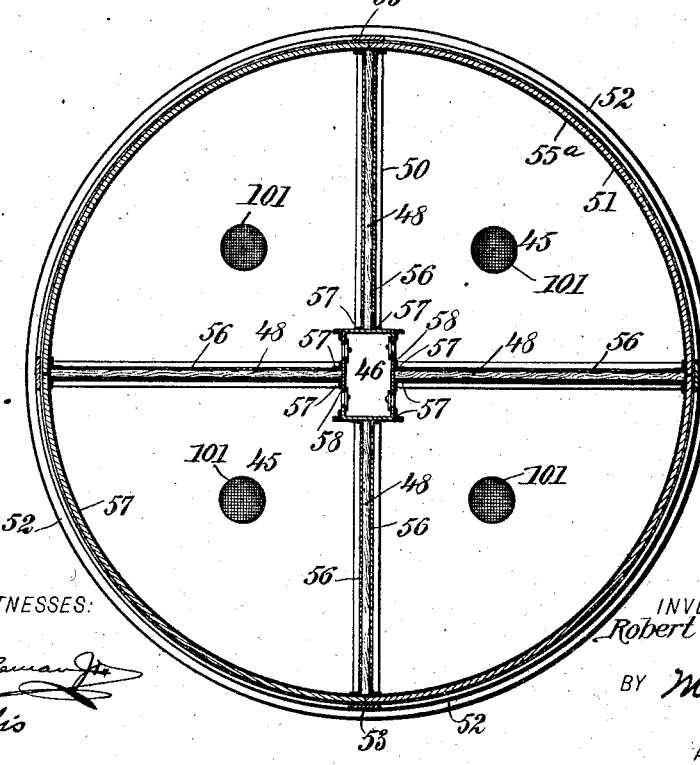

Figure 1 is a general side elevation of a grain storehouse or repository constructed in accordance with my invention. Fig. 2 is a vertical longitudinal sectional elevation of Fig. 1, showing more clearly the features of construction, organization, and operation of the different elements or parts contributing to my improvements. Fig. 3 is a horizontal sectional plan view of the bin structure taken about on the line $x$ $x$ of Fig. 2. Fig. 4 is a similar view taken about on the line $y$ $y$, also of Fig. 2. Fig. 5 is an enlarged part-sectional view in detail to more clearly indicate the construction and organization of the connections and fastenings between certain parts of my improved structure. Fig. 6 is an enlarged sectional detail view of certain fastenings or connections employed between other parts of the structure. Fig. 7 is a detail view of certain parts, and Fig. 8 is an enlarged sectional detail view showing the lining for the shell of the housing or repository.

Before proceeding with a more detailed description it may be stated that a grain or other storage plant constructed and operated in accordance with my invention comprises in a general way, preferably, an office or building for occupancy by the attendants or operators in charge of the plant and beneath which is constructed a suitable engine-room which may be above or beneath the ground-level, as may be desired. Under an archway on one side of the said office or building is a suitable driveway or platform beneath which is located a pit into which the grain or other material to be stored may be dumped, said pit leading to and communicating with a suitable place where means are employed for elevating the material to suitable devices or mechanism by which the same is delivered or emptied into the storehouse at the top of the latter. The storehouse may be of any desired height and transverse dimensions, and the same may also consist of a single continuous bin throughout or of a plurality of bins radially disposed about a central upright structure, and the said storehouse is also otherwise specially constructed, as will be more fully explained hereinafter. The foundation of the storehouse is also of special construction, and I employ suitable delivery mechanism for transferring the grain or other material from the storehouse to a car or other receiver therefor. The shell or casing of the storehouse is firmly braced and strengthened interiorly by specially-constructed devices and contrivances therefor, and all joints between the different parts of both the inner and outer structures are both water and damp proof, the material of the said structures, as well as all auxiliaries thereto, being also thoroughly fireproof, all as will be understood from the description about to follow.

The central upright structure referred to is in communication at its lower end with suitable means whereby any quantity or quantities of grain or other material may be transferred from any one or more of the bins of the storehouse to be elevated to the top of the latter, whence such material may be deposited into the upper end of said central structure, thence being caused to pass to the delivery mechanism, as will appear. I construct the central upright structure at intervals of its height with valves or other means, whereby the grain or other material in the bins may be inspected at any point of depth of the bins, and also by which removal or discharge of any desired quantity of grain or other material may be effected at such points, as may be required at any time.

At the upper end of the storehouse or repository I employ a hopper into which the grain or other material is received from the elevating devices therefor from the dumping-pit below, and said hopper is provided with suitable means by which the grain thus received therein may be distributed to the different bins.

Other features of my improvement will be referred to hereinafter, and it may be added that while I have herein represented a certain preferred embodiment of devices or elements employed I am not limited to the precise details thereof in practice, since immaterial changes therein may be resorted to coming within the scope of my invention.

Reference being had to the several parts by the designating characters marked thereon, 1 represents what may be termed the ordinary "ground-level" surrounding my improved storehouse plant, upon which are erected the stone or brick walls 2 2 of an ordinary basement or room 3, in which is located a suitable engine or motive-power apparatus 4, which will be hereinafter referred to. The upper part 5 of said basement or room 3 may be of cement or any suitable fire and damp proof material, and the same constitutes the bottom or floor of an office or building 6, which may be occupied by one or more attendants or operators of the plant, the said office or building being preferably constructed of pressed steel or other fireproof material and having a lining of asbestos or other non-conducting material, if desired. Connecting the said office or building 6 at one side thereof, and preferably, also, built of the same or analogous material, is an arch or covering 7 for a driveway having a platform 8 about on a level with the floor of the office, said platform and arch being supported in any suitable manner. Both the entrance to and exit from the driveway beneath the arch may be closed by suitable hinged or other doors 9, of metal or other suitable material, and in the platform of said driveway are provided suitable ordinary dumping-rails 10 10 for a cart or other vehicle, (not shown,) said rails, as well as the adjacent sides of the platform itself, being constructed, preferably, of angle-iron or steel, as shown. Beneath the platform of the driveway I construct a pit $10^a$, into which the grain or other material to be stored may be dumped, the floor 11 of said pit being preferably of cement and inclined outwardly and downwardly from the adjacent side wall of the engine-room 3, with the lower edge 12 thereof resting upon the upper edge of a brick or stone wall 13, constituting part of the general foundation of the structure, as will be fully understood from the description which is to follow. In order that the grain or other material 14 dumped onto said floor may not become contaminated or otherwise injured from dampness or moisture, the said floor 11 is preferably faced or lined on the under surface thereof with felt, tar-paper, or other suitable material $14^a$, and, if desired, the surrounding walls of the said pit $10^a$ may be faced or covered with the same or analogous material for a similar purpose. The inner wall 15 of the pit terminates at the lower part thereof a little short of the full depth of the pit at that side, thus forming an outlet or opening 16, through which the grain may pass by gravity into a hopper 17, located in the boot 18 of a vertical housing or inclosure 19 for any suitable form of elevator devices or mechanism, consisting, preferably, in the present instance, of an endless band or belt 20, provided at intervals thereof with buckets 21, in which quantities of the grain or other material may be received, as will be apparent. The said endless band or belt 20 passes around pulleys 22 and 23, located at the bottom and top, respectively, of the housing or inclosure 19, the shaft 24 of the latter pulley having thereon a sprocket or other gear wheel 25, which may be driven from any suitable source for the purpose of operating said elevator devices or mechanism—as, for instance, by means of a sprocket-chain $25^a$, operated from a similar sprocket-wheel $a$, carried at one end of a shaft $b$, which is driven by a sprocket connection $c$ from the shaft of the engine 4 in the basement or room 3. (See Fig. 2.) Located above the pulley 23 is a hopper 26, into which the grain is emptied from the buckets, and leading from the hopper is a chute or conduit 27, which will be referred to later on.

The outlet or opening 16 is controlled by means of a suitable sidable gate or valve 28, having a handle 29, by which the same may be operated from the platform of the driveway, said valve working in a suitable guide 30 therefor formed between the adjacent sides of the wall 15 and a supplementary wall 31. (See Fig. 2.)

The base of the general foundation 32 of my improved plant is laid a suitable depth beneath the ordinary ground level or surface, and such foundation consists of common or cut stone or other suitable material, which is preferably built up around a concrete or cement filling 33 to a height somewhat above said ground level or surface, as indicated at 34, for instance, this elevated or raised part 34 of the said foundation being preferably of approximately circular formation in plan view and having the upper surface thereof recessed or inclined downwardly and inwardly all around, as indicated at 35. Upon this upper inclined surface, and also preferably around the sides of the said part 34 of the foundation, I preferably apply a layer or layers of tar-paper or other damp-proof material 36 (see Fig. 2) of proper thickness, and then I apply over such material a cement covering 37 and 38 of any desired depth or thickness, the latter part 38 of such covering constituting the base or floor of the storehouse or repository of the plant. Fitted at the most central and lowest part of said base or floor 38 is a plate 39, having therein an opening 40, said opening leading to the upper end of a chute or conduit 42, suitably supported within an archway formed in the foundation at one side, as shown, the lower end of said chute or conduit emptying into the hopper 17 in the boot 18 and the said archway being large enough for the entrance of an attendant beneath the general structure (without destroying any part of the base or foundation) for the purpose of making any necessary repairs. The surrounding upper edge 43 of the part 34 of the base or foundation is adapted to receive and support the lower end of the housing or repository 44, (an angle-iron 44$^a$ closing the joint,) and while the whole interior of said housing may be continuous all around, thus to constitute a single bin only, I preferably divide the same radially to form a plurality of bins 45. (See Figs. 3 and 4.) Supported within the housing is a central vertical tubular structure 46, the lower end of which is supported upon the plate 39 referred to, the said structure having radial openings at such end which are closed by valves 47, said openings each communicating with one of the said bins and with the opening 40 in the plate 39 above the inner end of the chute or conduit 42. As a convenient means for operating these valves 47 I preferably connect each of them with a link 42$^a$, (in detail, Fig. 7,) which is connected in turn with an end of an arm 42$^b$, carried on the inner end of a rock-shaft 42$^c$, having bearings or supports 42$^d$, and the outer end of which is provided with a reversely-disposed arm 42$^e$ in movable connection with an operating-rod 42$^f$, leading upwardly through suitable guides therefor to a point above the said platform of the driveway, thus being in easy control of the operator. The said bins 45 are formed between the outer curved sides of the housing itself and suitable radially-disposed vertical partitions 48, which reach from about the base-line 49 of the housing proper to a point near the upper edge of the latter, while beneath said partitions 48 I preferably construct the recessed floor of the housing with similar radial cement partitions 50, alining therewith. The sides or walls of the housing or repository are preferably constructed of curved plates 51, supported one above the other edge to edge, and surrounding said plates at suitable distances apart vertically are duplicate angle straps or bands 52 of metal, it being observed (see Figs. 3 and 6) that the vertical meeting edges of said plates 51 are each lapped exteriorly by vertical strips 53, thus sealing the joints thereof, said strips being secured to the plates by rivets 54 (see Fig. 6) on opposite sides of each of the joints, and said pins each also passing through one of a pair of metallic angle-strips 55, extending vertically on the inner sides of said walls, each of these said opposite pairs of angle-strips also serving to confine and hold securely in position therebetween the outer vertical edges of one of the said partitions 48, it being mentioned that these latter may be of any suitable material, wooden strips covered on either side with metal strips 56 being herein shown; but in the event of steel being used instead of wood said angle-straps will be arranged closer together, according to the thickness of such steel. The inner vertical edges of the said partitions 48 are each similarly received in and supported by like pairs of angle-strips 57, secured vertically to the sides of the before-mentioned internal hollow structure 46, it being here explained that this latter element is provided in the sides 58 thereof with openings leading into the several mentioned bins 45, said openings being arranged at different vertical heights and closed or controlled by suitable doors or valves 59, which open into the interior of said structure. This internal structure is of transverse dimensions sufficient to enable an attendant to place a ladder therein and ascend or descend, either for the purpose of inspecting the material at different heights within the bins or to empty or draw off suitable quantities of material from any one or more of the bins, also at any height desired, it being mentioned that the grade of the material may sometimes vary at different depths of the same within the bins. Located at any suitable point in the height of this internal structure 46 is a gate or valve 60, which may be brought to substantially a horizontal position to completely close or divide the interior of said structure, and communicating with one side of the latter, close to said gate or valve, is the inner end of an inclined chute or conduit 61, the outer end of which extends through an opening therefor in the side of the housing and empties into a series of buckets or other devices 62 for delivering quantities of grain or other material to a car or other receiver (not shown) for the purpose of transfer or shipment thereof.

By the employment of duplicate angle straps or bands 52 at the horizontal meeting edges of the curved plates 51 of the housing much of the work of construction is enabled to be prepared in the factory, as is apparent, one of such straps or bands of each pair being applied to a section of plate and the pair afterward united at the time of erecting the housing, the construction being thus rapidly facilitated.

It may be stated at this point that preferably I employ strips of tar-paper and asbestos 63 and 64 at the joints of the plates 51 between the surfaces of the said plates and strips 53 and angle-strips 55, respectively, thus to insure the exclusion of moisture or dampness from said joints. Also, as shown in Fig. 2, I preferably apply to the entire interior of the material of the housing or repository a lining or covering of asbestos-cloth or other similar material $55^a$ for the purpose of rendering the same damp-proof, a like covering being also applied to the surface of each of the partitions separating the bins, if desired. In Fig. 8 is shown in detail one manner of applying such lining or covering to the shell and which consists in first laying onto the said inner surface thereof a suitable gum or adhesive $56^a$ and afterward laying on the said asbestos or other cloth and the effectiveness of which for the purpose named will be fully apparent.

In order to simplify, brace, and strengthen the entire storehouse, I employ the following means: As shown in the detail view Fig. 5, the angle straps or bands 52 are located at the horizontal joints between the curved plates 51 of the storehouse, and said angle-straps are preferably in duplicate at each of such joints, rivets $52^a$ securing the two together and other rivets, $52^b$, passing through one of the straps and the plates on one side of the joint, as shown. Between the adjacent surface portions of said angle-straps and the plates 51 strips of tar-paper $52^c$ or analogous material are inserted, and lapping each horizontal joint between the plates on the inner surface of the latter is a metallic band 65, which may be covered with tar-paper, felt, or other similar material 66, the general construction and organization of these latterly-described elements being such as to render the joints in question both air-tight and damp and water proof, it being noted that the rivets $52^b$ also pass through openings therefor in said strip 65 and its covering. Also passing through corresponding openings therefor in the other angle-strap 52, the plates 51, and the bands 65 are bolts 66, each having a collar 67 on the inner part thereof and provided at its inner end with a yoke 68, carrying a pulley 69, any suitable number of said yokes and pulleys being employed at the inner surface of the storehouse, as may be required, four of the same being herein shown at Fig. 3, and which will be presently again referred to. Each of the bolts 66 is threaded at its outer end and provided with a tightening-nut $66^a$. Connecting diametrically opposite portions of the upper part of the inner surface of the storehouse with adjacent sides of the internal structure 46 are duplicate sets of horizontally-disposed rigid brace-rods 70, the inner and outer ends whereof are securely held by angle-brackets 71 and 72, respectively, and supported on either side of preferably the center one of each set of said brace-rods is a yoke-and-pulley device 73 in all respects the same as that already described with reference to Fig. 5. Also supported at suitable points on opposite sides of opposite ones of the partitions 48, at near the upper edge thereof, are similar yoke-and-pulley devices 74, while at corresponding points of the sides of the internal vertical structure 46 still other devices 75 of substantially the same form are held or supported. Now by passing wire ropes or cables 76 around or about the different pulleys described substantially in the manner shown in Fig. 3 it is apparent that a very secure bracing or strengthening means may be derived for the whole structure, it being understood that said ropes or cables may be drawn up as tightly as desired, attention being also called to the central square and radiating triangular formations or directions which said cables are made to follow, whereby substantial equilibrium is attained. Mounted upon the upper surfaces of the said sets of rigid brace-rods 70 is a stand or support 78 for a hopper or tank 79, into which the lower end of the chute or conduit 27 empties, it being noted that said stand and tank, as well also as the hopper 26 and said chute 27, are all inclosed by a hood or cover 80, which is practically a lateral extension of the inclosure 19 for the elevating devices, said hood or cover also constituting a closure for the upper end of the storehouse proper on which it rests. Said hood is preferably provided with a ventilator 81 and also a glass-covered opening 82 for the admission of light to the interior. The bottom of said hopper or tank 79 is conical, as shown, to facilitate discharge of grain therefrom, a suitable slide or other valve $82^a$ being employed to regulate the discharge, and leading from the bottom of the tank is a delivery-tube 83, which may be directed toward any one of the bins 45 either by turning the said pipe or tank, both of which may be made rotatable for that purpose.

In order that vitiated air may be drawn from the interior of the bins caused by any possible putrefaction of the material contained therein, I preferably employ a pipe 100, leading upwardly into each bin and provided with a gauze or perforated cap 101 for preventing any of such material from falling into the pipe, and these pipes extend laterally at 102, thence upwardly at 103 through the floor of the engine-room 3, where they may be connected at 104 with a chemical apparatus 105, blower, or the like.

In operation the elevator devices are kept in motion from the engine 4, and the loads of grain received at the plant are dumped into the pit 10$^a$, as described. By opening the gate or valve 30 the grain will flow through the opening 16 into the trough or hopper 17 and will be carried up and deposited in the hopper or tank 79, as is apparent, from which latter it may be emptied into the several bins for storage. Whenever a definite quantity of grain is to be taken from the storehouse, the valves 47 (one or more) are opened, (the gate or valve 60 having been previously adjusted across the interior of the inner structure 46,) whereupon grain will flow into the chute or conduit 42 and be taken up by the elevator devices and delivered to the tank 79 as before, the pipe 83, however, being now directed into the upper end of said inner structure 46, and the said grain will thus fall upon the said gate or valve 60 and out through the chute or conduit 61 to the delivery devices 62.

Having thus described my invention, I claim as new and desire to secure by Letters Patent—

1. A storehouse for grain, comprising a substantially circular outer structure, and a central internal structure, a plurality of diametrically-disposed brace-rods, connecting the two structures interiorly, and strengthening-cables also connecting said structures and braces.

2. A storehouse for grain, comprising a substantially circular outer structure, and a central internal structure, a plurality of diametrically-disposed brace-rods connecting the two structures, yokes supported by said structures and braces, each carrying a pulley, and strengthening-cables passing about said pulleys in different directions between the points of support thereof.

3. A storehouse for grain, comprising a substantially circular outer structure, and a central internal structure, the space between the two structures being divided vertically by radial partitions, a plurality of diametrically-disposed brace-rods connecting the two structures, and strengthening-cables connecting said structure and the said partitions and braces, substantially as shown and described.

4. A structure for grain and similar substances, constructed of steel or the like and having its inner surface provided with an adhesive, and an applied lining of non-conducting material.

5. A storehouse for grain and like material, comprising a substantially circular outer structure consisting of curved plates, vertical strips on the outer sides of said plates and covering the vertical joints between the plates, pairs of metallic angle-strips extending vertically on the inner side of the structure and secured to the same and to the outer vertical strips, a central internal structure, vertical radial partitions extending between the central and the outer structure and each held at its outer vertical edge between the members of a pair of said angle-strips, and braces and strengthening-cables connecting the structures.

6. A storehouse for grain and like material, comprising a substantially circular outer structure, vertical angle-irons arranged in pairs and secured to the inner surface of said structure, a central internal structure, radial partitions dividing vertically the space between the two structures and each held at its outer vertical edge between the members of a pair of said angle-irons, braces connecting the structures, and strengthening-cables connecting the structures and braces, as set forth.

7. A storehouse for grain and like material, comprising a substantially circular outer structure, and a central internal structure the space between the two structures being divided vertically by radial partitions, braces connecting the structures, yokes supported by said structures and braces, a pulley carried by each yoke, and strengthening-cables passing about said pulleys, as set forth.

8. A storehouse for grain and like material comprising a substantially circular outer structure consisting of curved plates, supported one above the other edge to edge, double angle straps or bands located at the horizontal joints between the curved plates on the outer side thereof, vertical strips on the outer sides of said plates and covering the vertical joints between the plates, pairs of metallic angle-strips extending vertically on the inner side of the structure, a central internal structure, vertical partitions extending between the central and the outer structure and each held at its outer vertical edge between the members of a pair of said angle-strips, a plurality of brace-rods connecting the structures and strengthening-cables connecting the structures and braces, as set forth.

9. A storehouse for grain and similar substances, comprising an outer structure constructed of steel or the like and having a lining of non-conducting material, and a central internal structure, the space between the two structures being divided vertically by radial partitions, and brace-rods connecting the structures, as set forth.

10. A storehouse for grain and the like, comprising an outer structure, a central internal structure, pairs of angle-strips extending vertically and secured to the inner surface of the outer structure, similar pairs of angle-strips secured to the outer surface of the internal structure, vertical partitions extending between the structures and held by said angle-strips, and brace-rods and strengthening-cables connecting the two structures, as set forth.

11. A storehouse for grain and similar substances, comprising a substantially circular outer structure consisting of curved plates, vertical strips on the outer sides of said plates and covering the vertical joints between the plates, pairs of metallic angle-strips extending vertically on the inner side of the structure, waterproof material on the inner and outer surfaces of the structure between the same and the said strips, a central internal structure, vertical partitions extending in the space between the structures and held at their outer edges by said angle-strips, brace-rods connecting the two structures, and strengthening-cables connecting the said structures and the said partitions and brace-rods, as set forth.

12. In a storehouse for grain and similar substances, a substantially circular outer structure comprising curved plates, double angle-irons secured thereto at the horizontal joints between the plates, metallic bands on the inner surface of said plates at the horizontal joints, bolts extending through one of the said angle-irons and the corresponding plate and band at the upper part of the structure and each provided at its inner end with a yoke carrying a pulley, a central internal structure, brace-rods connecting the two structures interiorly, yokes supported by said braces and the internal structure and each carrying a pulley, and strengthening-cables passing about said pulleys and the pulleys on the outer structure, as set forth.

In testimony whereof I have signed my name to this specification in the presence of two subscribing witnesses.

ROBERT CORNELIUS ROACH.

Witnesses:
 JNO. W. JONES,
 J. F. POWERS.